United States Patent [19]

Smith et al.

[11] Patent Number: 5,800,624

[45] Date of Patent: Sep. 1, 1998

[54] MEMBRANE PROCESS FOR SEPARATING CARBOHYDRATES

[75] Inventors: Bradley D. Smith; Jennifer A. Riggs, both of South Bend, Ind.

[73] Assignee: University of Notre Dame, Notre Dame, Ind.

[21] Appl. No.: 734,998

[22] Filed: Oct. 22, 1996

[51] Int. Cl.$^6$ .................. C13J 1/06; C13D 1/08; C13D 3/12; B01D 15/00

[52] U.S. Cl. .................. 127/461; 127/42; 127/46.3; 127/53; 127/54; 127/55; 210/634; 210/638

[58] Field of Search .................. 127/42, 46.1, 46.2, 127/46.3, 53, 54, 55; 210/634, 638

[56] References Cited

U.S. PATENT DOCUMENTS

| | | | |
|---|---|---|---|
| 2,813,810 | 11/1957 | Wayzata et al. | 127/46.2 |
| 3,228,876 | 1/1966 | Mahon | 210/638 |
| 3,228,877 | 1/1966 | Mahon | 127/42 |
| 3,416,961 | 12/1968 | Mountfort et al. | 127/42 |
| 3,533,839 | 10/1970 | Hara et al. | 127/46.1 |
| 3,692,582 | 9/1972 | Malaja | 127/46.1 |
| 3,806,363 | 4/1974 | Takasaki | 127/46.2 |
| 3,864,166 | 2/1975 | Barker et al. | 127/46.1 |
| 4,014,711 | 3/1977 | Odawara et al. | 127/46 B |
| 4,077,407 | 3/1978 | Theeuwes et al. | 128/260 |
| 4,157,267 | 6/1979 | Odawara et al. | 127/46 A |
| 4,295,994 | 10/1981 | Kulprathipanja | 127/46.3 |
| 4,299,677 | 11/1981 | Venkatasubramanian et al. | 204/180 P |
| 4,325,742 | 4/1982 | Arena | 127/46.2 |
| 4,340,724 | 7/1982 | Neuzil et al. | 127/46.1 |
| 4,443,267 | 4/1984 | Pansolli et al. | 127/46.2 |
| 4,472,203 | 9/1984 | Miyahara et al. | 127/46.2 |
| 4,702,839 | 10/1987 | Koerts et al. | 210/638 |
| 4,735,193 | 4/1988 | Kulprathipanja et al. | 127/46.3 |
| 5,008,189 | 4/1991 | Oroskar et al. | 127/55 |
| 5,176,832 | 1/1993 | Dorta et al. | 210/635 |

OTHER PUBLICATIONS

ACS Symposium Series 642, "Chemical Separation with Liquid Membranes",R.A.Bartsch–D.A.Way, Ed., 1996 ACS.

Shinbo,T., et al., J.Chem.Soc.,Chem Eommun.1986 pp. 349–351, Aug. 1985.

Shinbo,T.,et al., 1987, ICOM 1987, Japan.

Hayashita, T., Chemistry Letters, 1996, pp. 37–38, Sep. 1995.

Sugiura, M., et al., Chemical Express,vol. 8,No. 7,pp. 519–522, 1993.

Sugiura,M.,et al.,Chemical Express,vol.8,No.4,pp. 249–252, 1993, Jun 1992.

Sugiura,M., Separation Science and Technology,28(7),pp. 1453–1463, 1993, Jun. 1992.

Neplenbroeck,et al.,Journal of Membrane Science,67,pp. 149–165, 1992, Mar. 1991–Jul. 1990.

Schow,Adam J.,et al.,Journal of Membrane Science,111, pp. 149–2 91–295, 1996, Oct. 1995–Jul. 1995.

Igawa,M.,et al.,Journal of Membrane Science,98,pp. 177–180, 1995, Nov. 1993.

Smith,B.D.,Supramolecular Chemistry, vol. 7,pp. 55–60, 1996, Apr. 1995.

Tragardh,G.andGekas,V.,Desalination,89.pp. 9–17, 1988, Jul. 1987.

*Primary Examiner*—Glenn Caldarola
*Assistant Examiner*—Patricia L. Hailey
*Attorney, Agent, or Firm*—William B. Scanlon

[57] ABSTRACT

Plasticized liquid membranes and processes for separating monosaccharides from disaccharides and from other monosaccharides employing the membranes are provided. Fructose is separated from glucose via the membrane process to provide fructose in concentrations sufficient for HFS (high fructose syrup) and sucrose, glucose and fructose are separated from crude sources such as molasses, sugar cane juice and beet sugar juice. The plasticized membranes are prepared by dissolving a lipophilic polymer such as cellulose triacetate, an organic liquid plasticizer such as a hydrophobic ether compound e.g. 2-nitrophenyloctyl ether and, a carrier compound such as a quaternary ammonium salt or a boronic acid compound with lipophilic substitution in a suitable solvent which upon evaporation provides the plasticized membrane. The membrane produced is homogeneous having all three components equally dispersed in the membrane. Also provided are new boronic acid compounds which are especially useful carrier compounds for the transport of monosaccharides such as fructose through the membranes.

20 Claims, 1 Drawing Sheet

GLUCOSE ISOMERIZATION AND FRUCTOSE ENRICHMENT

GLUCOSE ISOMERIZATION AND FRUCTOSE ENRICHMENT

FRUCTOSE FLUX VERSUS AMOUNT OF TOMA Cl (TRIOC-YTLMETHYLAMMONIUM CHLORIDE) IN 0.5 g PLM

MEMBRANE PROCESS FOR SEPARATING CARBOHYDRATES

The U.S. Government has rights in this invention by virtue of National Science Foundation Grant No. CHE93-11584.

BACKGROUND OF THE INVENTION

This invention relates to a process for the separation of carbohydrates. In particular it relates to a process for the separation of monosaccharides and disaccharides employing a plasticized liquid membrane.

The separation of carbohydrates such as sucrose, glucose and fructose from mixtures thereof or from crude sources has been the subject of extensive research. This work has been aimed at recovering these valuable compounds from natural sources in a more useable form and at the selective separation of a component from a mixture of like compounds. For example, research continues to improve the overall yield of sucrose in commercial processes, such as the process for obtaining sucrose from cane sugar or sugar beets. Also, significant effort has been directed to the separation of fructose from mixtures of fructose and glucose to provide products with enhanced sweetness such as high fructose corn syrup.

DESCRIPTION OF THE PRIOR ART

The prior art describes a range of efforts to separate sugars using membrane technologies, Tragardh, G.; Gekas, V. Desalination, 1988, 69, 9–17). This work includes membranes capable of separation by filtration, ion-exchange or ion-exclusion. Studies on transport of sugars through bulk liquid membranes and supported liquid membranes are efforts related to the invention described herein. A bulk liquid membrane is simply a water-immiscible solution of a carrier compound dissolved in an organic liquid such as chloroform that separates two aqueous phases. Supported liquid membranes generally comprise a porous polymer such as polypropylene that retains the carrier/liquid organic solution by capillary action to provide a heterogeneous membrane mixture. Shinbo and coworkers used these membranes in a study of facilitated monosaccharide transport using a carrier mixture of phenylboronic acid and trimethyloctylammonium chloride, (T. Shinbo et al., Chem. Commun, 1986, 349 and T. Shinbo et al., Int. Congr. Membranes and Membrane Process,Tokyo, 1987, 813.) The bulk and supported liquid membrane technology has experienced two problems, namely, low overall fluxes and, importantly, poor membrane stability. The invention provided herein overcomes these two problems by using a new type of membrane, a Plasticized Liquid Membrane (PLM).

PLMs have been studies before as materials to separate mixtures of metal cations. These membranes have been referred to in the literature as solvent polymeric membranes (Vofsi et al., Naturwissenschaften, 1974, 61, 25), gelled liquid membranes (Nepienbroek, et al., J. Membr. Sci. 1992, 67, 149) and polymer inclusion membranes (Schow et al., Membr. Sci. 1996, 111, 291). The PLMs described herein differ significantly from those previously reported in that they are selectively permeable to mono- and disaccharides.

SUMMARY OF THE INVENTION

Figure 1:
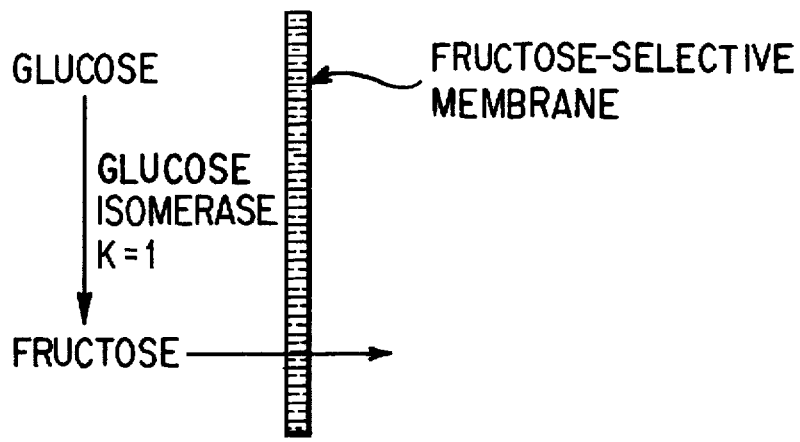
FIG. 1 of the drawing is a schematic diagram of the process for converting glucose to fructose and the separation of the latter.

The invention provides plasticized liquid membranes (PLM) employed in a process for separating disaccharides and monosaccharides such as sucrose, glucose and fructose. The PLM is a homogeneous membrane comprising an inert polymeric support such as cellulose triacetate plasticized with an organic plasticizer selected from an ether compound, e.g., 2-nitrophenyloctyl ether; a phosphate triester, e.g., tris(2-butoxyethyl)phosphate; a glycerol phosphate ester, e.g., the diethylphosphate ester of dioctyl ester of glycerol, and a triglyceride ester e.g., the tri-butyl or tri-octyl ester of glycerol; and containing a carrier compound for transporting the sugar(s) through the membrane. Carriers that are used are selected from a quaternary ammonium salt e.g., trioctylmethylammonium chloride, a tetraalkylphosphonium salt e.g., tetrabutylphosphonium chloride, and an alkyl or arylboronic acid such as a substituted phenylboronic acid e.g., 4-[8-(2-nitrophenoxy)octyloxycarbonyl]phenylboronic acid.

In an embodiment of the process a mixture of sugars e.g, sucrose, glucose and fructose or a crude mixture of sugars such as molasses is dissolved in water (source phase) and the solution placed in contact with the surface of the PLM with the opposite surface of the PLM in contact with water (receiving phase). The process is carried out at a pH between about 2 and about 12 and at a temperature between about 5° C. and about 80° C. For example a source phase containing a solution of molasses in water which contains the sugars sucrose, glucose and fructose is contacted with a PLM containing a quaternary ammonium salt carrier which transports all three sugars into the receiving phase.

In a preferred embodiment of the invention fructose is separated from a mixture of glucose and fructose by using a PLM comprising cellulose triacetate plasticized with 2-nitrophenyloctyl ether and containing the boronic acid carrier, 4-[8-(2-nitrophenoxy)octyloxycarbonyl] phenylboronic acid either alone or mixed with the carrier trioctylmethylammonium chloride. In a further preferred embodiment for the separation of fructose from glucose comprising 2-steps, a solution of D-glucose in water (source phase) in contact with the PLM described above, is treated with D-glucose isomerase and, in step 2 the fructose formed in the source phase is transported by the boronic acid carrier compound into the water (receiving phase). In this embodiment of the process, high levels of the fructose in the receiving phase are achieved sufficient to obtain High Fructose Syrup (HFS), a substitute for sucrose.

The invention also provides boronic acid carrier compounds represented by the formula

wherein Z is an alkoxy group $R^{11}$—O— or an amino group $R^{12}R^{13}N$—, wherein $R^{11}$ is a straight or branched chain $C_4$–$C_{10}$ alkyl radical which can be substituted by phenyl or phenoxy, or phenyl or phenoxy substituted by lower alkyl, lower alkoxy, nitro, carboxy, carboxamido, cyano, or lower alkoxy carbonyl. $R^{12}$ and $R^{13}$ independently are $C_1$–$C_{12}$ alkyl which can be substituted by phenyl or phenoxy or phenyl or phenoxy substituted with the same groups as defined hereinabove for $R^{11}$.

DETAILED DESCRIPTION OF THE INVENTION

The process provided by this invention affords separation of monosaccharides and disaccharides from sources of such sugars, e.g. molasses, sugar cane juice or beet juice. The process also provides separation of monosaccharides from mixtures with other monosaccharides, disaccharides or other unwanted components and separation of disaccharides from mixtures with other disaccharides or unwanted other components of the mixture.

As used herein monosaccharide refers to pentose such as ribose, rhamnose and arabinose and to hexoses such as glucose, mannose, galactose and fructose. Disaccharide as used herein refers to sucrose, lactose, cellobiose, lactulose and maltose.

The above noted carbohydrates are obtained from natural sources, for example, sucrose is obtained from sugar cane or sugar beets, or they are obtained by the conversion of other carbohydrates. For example, sucrose is hydrolyzed to a mixture of glucose and fructose. Starch is hydrolyzed with acid to glucose. Also, glucose is enzymatically converted to a mixture with fructose.

The monosaccharides and disaccharides described above are valuable substances useful for many purposes. For example, most serve as energy sources for mammals while others are sweetening agents, sources for other carbohydrates or, many can be used in pharmaceutical formulations. Because of the importance of these carbohydrates a method for separating the individual carbohydrates from mixtures with one another or from unwanted substances would be commercially important.

The process of this invention is applicable to sugars in any stereochemical form. For example, it can be used to separate D-glucose or L-glucose from D-fructose or L-fructose.

According to the process of this invention an aqueous impure mixture of a monosaccharide or of a disaccharide at a pH between about 12 and about 2 (referred to herein as the source phase) is placed in contact with one surface of a plasticized liquid membrane while the opposite surface of the membrane is in contact with an aqueous receiving phase at a pH between about 12 and about 2. The desired monosaccharide or disaccharide is then preferentially transported through the liquid membrane to the receiving phase by a carrier compound maintained in the membrane. The process is carried out at a temperature between about 5° C. to about 80° C.

The plasicized liquid membrane (PLM) used in the process is a homogeneous mixture of three chemical components: 1. an inert polymeric support, 2. an organic liquid which is called the plasticizer and, 3. a carrier compound. The relative fraction of the three components can be varied. Generally the fraction of polymer is between 10%–50% by weight, the plasticizer is between 10%–70%, and the carrier between 1%–60%. The three components are described more specifically below. The PLM used in the process is an achiral membrane and D- or L-isomers of sugars or mixtures thereof can be used in the process.

1. Inert Polymer Support. The polymeric support provides strength and support for the membrane. It is unreactive with the aqueous source and receiving phases. The polymer support can be any of a number of lipophilic polymer materials such as a vinyl resin, for example, polyvinyl acetate, polyvinyl chloride or polyvinyl butyral; a cellulose polymer such as for example, cellulose triacetate or cellulose nitrate; an acrylate polymer such as polymethacrylate; or other suitable inert lipophilic polymer support or mixtures of such polymers.

2. The Plasticizer The plasticizer gives the membrane its plastic properties. It is a hydrophobic organic liquid that acts as a solvent for the carrier compound. It is unreactive with the source phase and the receiving phase. The plasticizer may have some polar character enabling it to loosely combine with the carrier-carbohydrate complex. A wide range of plasticizers can be used. The most common plasticizers are organic ether derivatives, esters of carboxylic acids or esters of phosphoric acids. The plasticizer of the present invention is selected from the group consisting of an ether represented by the formula 1

wherein, $R^0$ and $R^1$ independently are a straight or branched $C_4$–$C_{10}$ alkyl hydrocarbon radical; phenyl or phenyl substituted by halogen, $C_1$–$C_4$ alkyl, nitro, cyano, trifluoromethyl, $C_1$–$C_4$ alkoxy or $C_1$–$C_4$ alkoxycarbonyl;

a phosphate tri-ester represented by the formula 2,

wherein, $R^2$ is $C_1$–$C_{16}$ alkyl and m is an integer of from 1 to 3;

a glycerol phosphate ester represented by the formula 3

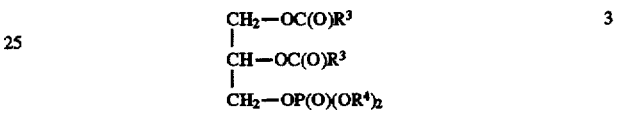

wherein, each $R^3$ is the same or different straight or branched chain alkyl residue of a $C_4$–$C_{16}$ alkyl carboxylic acid and $R^4$ is $C_1$–$C_{16}$ alkyl;

and a triglyceride represented by the formula 4

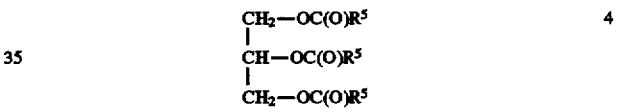

wherein each $R^5$ is the same or different straight or branched chain $C_4$–$C_{16}$ alkyl residue.

Examples of ether plasticizers represented by the formula 1 are di-n-butyl ether, n-butylhexyl ether, didecyl ether, diphenyl ether, di-(4-chlorophenyl) ether, di-(4-t-butylphenyl) ether, and phenyl alkyl ethers such as for example, phenyloctyl ether, 4-(t-butyl)phenylheptyl ether, 4-fluorophenylhexyl ether, 3-ethoxycarbonylphenylbutyl ether, 4-nitrophenyloctyl ether, 2-nitrophenyloctyl ether, 3-ethoxyphenylamyl ether, 4-trifluoromethylphenylbutyl ether, 2-nitrophenylinonyl ether, 3-isopropoxyphenylamyl ether, and like ethers.

Examples of phosphate tri-esters represented by the above formula 2 are tris(2-butoxyethyl)phosphate, tris(n-butoxymethyl)phosphate, tris(2-ethoxyethyl)phosphate, tris (3-methoxypropyl)phosphate, tris(isopentoxymethyl) phsophate, and like esters.

Examples of glycerol phosphate esters are represented by the above formula 3 wherein each $R^3$ is butyl, hexyl, or octyl, or one of $R^3$ is butyl and the other is pentyl, hexyl or octyl, and $R^4$ is methyl, ethyl or isopropyl.

Examples of triglycerides are represented by the above formula 4 wherein each $R^5$ is the same and is butyl, hexyl, heptyl or octyl, or one of $R^5$ is butyl or octyl and either or both of the other two such groups are butyl, amyl, or octyl.

3. The Carrier Compound The carrier compound is soluble in the plasticized membrane and has both lipid and polar (hydrophobic and hydrophilic) properties. Carrier compounds can be used alone or as a mixture with other carriers so long as the carrier combination is substantially soluble in the liquid membrane. The carrier has the ability to associate reversibly with the water soluble carbohydrate at the interface of the PLM and the source phase and to transport the carbohydrate to the receiving phase where it is released. If a membrane is prepared without the carrier component, then the amount of observed membrane transport is substantially reduced.

The carrier compound used in the process can be a lipophilic ion pair such as a quaternary ammonium salt represented by the formula 5

$$R^6R^7R^8R^9N^+A^-  \quad\quad 5$$

wherein each of the R radicals is a $C_1$–$C_{20}$ straight or branched chain alkyl group or a cyclo aliphatic group containing from 3 to 8 carbon atoms, and wherein at least one of the R radicals is a straight or branched chain alkyl group having from 4 to 20 carbon atoms, and $A^-$ represented a halide for example, chloride, bromide or iodide, or a conjugate base of an acid for example, a carboxylate, sulfonate, phosphonate, or phosphinate anion.

Examples of quaternary ammonium salts represented by the foregoing formula 5 are tetrabutylammonium chloride, trimethyloctylammonium chloride, trimethyloctylammonium p-toluenecarboxylate, trimethylheptylammonium p-toluenesulfonate, triethyloctylammonium diphenylphosphinate, trimethyloctylammonium bis(2-ethylhexyl)phosphonate, t-butyltriethylammonium bromide, tetrahexylammonium chloride, trioctylmethylammonium chloride, didodecyldimethylammonium bromide, tripropylheptylammonium chloride, trimethylcyclohexylammonium chloride, di-t-butyldimethylammonium chloride, and like quaternary ammonium salts.

Tetraalkylphosphonium salts represented by the following formula 6 also can be used as carriers in the present process.

$$R^6R^7R^8R^9P^+A^-  \quad\quad 6$$

wherein each R radical and A having the same meanings as defined above for formula 5.

Examples of such phosphonium salts include tetrabutylphosphonium chloride, trimethylhexylphosphonium bromide, trimethyloctylphosphonium chloride, triethylamylphosphonium p-toluenesulfonate, trihexylmethylphosphonium diphenylphosphinate, dicetylmethylphosphonium chloride, dioctyldimethylphosphonium benzoate, and like phosphonium salts.

The carrier used in the present process also can be an alkyl or arylboronic acid represented by the following formula 7

$$R^{10}B(OH)_2  \quad\quad 7$$

wherein $R^{10}$ can be a wide range of lipophilic alkyl and aromatic groups. The main function of the $R^{10}$ group is to provide the boronic acid compound with sufficient lipophilicity to ensure that it remains in the organic plasticized membrane and is not extracted into the aqueous phases. In general, arylboronic acids are preferred over alkylboronic acids because the aryl group is less susceptible to chemical and air oxidation and the aryl group renders the boronic acid more acidic, thus it is a better sugar complexing agent and a better transport carrier.

Arylboronic acids such as phenyl and substituted phenylboronic acids can be used in the present process either alone or with a quaternary ammonium or phosphonium carrier. Phenylboronic acids which may be used are defined wherein the phenyl ring may be unsubstituted or substituted by one or two of the same or different groups selected from among alkyl having from 1 to 16 carbon atoms and which may be a straight or branched chain alkyl group, halogen, trifluoromethyl, hydroxy, alkoxy, wherein the alkyl moiety may have from 1 to 6 carbon atoms, carboxy, alkoxycarbonyl wherein the alkoxy moiety thereof may have from 1 to 10 carbon atoms and which may be substituted on any carbon atom thereof by halogen, cyano, phenoxy, nitrophenoxy, alkylphenoxy wherein the alkyl group of the alkylphenoxy group may have from 1 to 6 carbon atoms. Examples of boronic acids represented by the foregoing formula include phenylboronic acid, 4-(t-butylphenyl)boronic acid, 3,5-trifluoromethylphenylboronic acid, 4-hexylphenylboronic acid, 3,4-diethoxyphenylboronic acid, 4-(t-butoxyphenyl)boronic acid, 4-butoxycarbonylphenylobornic acid, 4-(4-phenoxybutoxycarbonyl)phenylboronic acid, 4-[8-(2-nitrophenoxy)octyloxy]phenylboronic acid, 2-nitrophenylboronic acid, 4-[6-(4-nitrophenoxy)hexyloxycarbonyl]phenylboronic acid, and like boronic acids.

In one of its aspects the invention provides preferred phenylboronic acids represented by the formula 7 wherein $R^{10}$ represents a substituted phenyl group of the formula —($C_6H_4$)—C(O)—Z wherein Z represents an alkoxy group —O—$R^{11}$ or an amino group —$NR^{12}R^{13}$, wherein $R^{11}$ is a straight or branched chain $C_4$–$C_{10}$ alkyl radical which can be substituted by phenyl or phenoxy, or phenoxy and phenyl substituted by lower alkyl, halogen, lower alkoxy, nitro, carboxy, lower alkoxycarbonyl, carboxamido or cyano. $R^{12}$ and $R^{13}$ independently are $C_1$–$C_{12}$ alkyl which can be substituted by phenyl or phenoxy or phenyl and phenoxy substituted by lower alkyl, lower alkoxy, halogen, nitro, carboxy, carboxamido, cyano, or lower alkoxycarbonyl. Examples of such preferred carriers wherein Z is alkoxy group are 4-(n-butoxycarbonyl)phenylboronic acid, 4-(4-phenoxybutoxycarbonyl)phenylboronic acid, 4-[8-(2-nitrophenoxy)octyloxycarbonyl]phenylboronic acid, 4-[6-(4-nitrophenoxy)hexyloxycarbonyl]phenylboronic acid and the like. Examples of preferred carriers wherein Z is an amino group are 4-(N,N'-dibenzylamido)phenylboronic acid, 4-(N,N'-dioctylamido)phenylboronic acid, and 4-[N,N'-di-8-(2-nitrophenoxy)actylamido]phenylboronic acid.

In the foregoing description of the preferred phenylboronic acids, the term lower alkyl and lower alkoxy refers to alkyl and alkoxy groups having from 1 to 6 carbon atoms which may be straight or branched chain alkyl or alkoxy groups.

The PLM used in the present process can be prepared by the following method. The polymer support, the plasticizer and the carrier are dissolved in a suitable solvent and the solution is allowed to evaporate at ambient temperatures or, the solvent is removed with warming under reduced pressure, to provide a thin film of the PLM. Suitable solvents for use in the preparation are organic solvents in which the polymer, the plasticizer and the carrier compound are substantially soluble. Typical solvents include the ethers such as tetrahydrofuran, halohydrocarbons such as, for example, chloroform, carbon tetrachloride, methylene chloride, dichloroethane and trichloroethane; amide solvents such as, for example, dimethylformamide and dimethylacetamide and like solvents or mixtures thereof.

The plastic membrane may be configured in a variety or geometries to suit particular applications of the process, for example, the support may be prepared as thin films, sheets, plates, cylinders, or for large scale useage of the process, in hollow fibers. The hollow fiber walls comprise the PLM and the source phase either is passed through the fibers, for example by pumping, while the fibers are suspended in the receiving phase or, the fibers may be suspended in the source phase and the receiving phase is passed through the fibers.

The receiving phase used in the process is preferably water and generally has the same pH as the source phase or it may be buffered in certain uses of the process as described hereinafter. The separated monosaccharide or disaccharide or product mixtures of the process are recovered from the aqueous receiving phase by following conventional procedures such as evaporation or lyophilization or, the receiving phase may be diluted with an antisolvent to precipitate the sugar content. The particular antisolvent used will depend on the particular sugar or sugars in the receiving phase. Depending upon the final useage to which the sugar or the sugar mixture is to be put further processing of the recovered products may be desirable.

In the foregoing description of the present process the term, "aqueous impure mixture" refers to a mixture of monosaccharides, a mixture of disaccharides or, a mixture of one or more monosaccharides with one or more disaccharides. Such mixtures may also contain other substances which are carried over from the source of the mixture. For example, molasses, which is a by product in the commercial production of sucrose contains in addition to sucrose, glucose and fructose, a high percentage of ash and nitrogen containing compounds as well as other substances.

A mixture of glucose and fructose is an impure mixture as the term is used herein since if the desired monosaccharide is fructose, the impurity is glucose.

The terms, "preferentially transported" and "preferentially separated", mean that in the process one monosaccharide or disaccharide exhibits a substantially greater flux than another monosaccharide or disaccharide in the source phase.

The process of this invention provides for preferential transport of a desired monosaccharide or disaccharide from the impure mixtures described above. Where transport of one such sugar to the exclusion of other sugars in the mixture of the source phase does not occur, the receiving phase may be recycled in the process to further enhance the concentration of the desired sugar.

In one of its aspects the invention provides a process for separating mono- and disaccharides from impure mixtures such as molasses or other crude source which comprises contacting the source phase with a PLM containing a quaternary ammonium salt as a carrier compound. In this aspect of the invention both mono- and disaccharides are transported through the PLM while non-sugar components are left behind in the source phase. It may be necessary to pretreat the crude saccharide source prior to use in the process since large amounts of impurities may inhibit transport of the sugars through the PLM. For example the crude source may be subjected to an organic or a mild aqueous acid or base wash to remove impurities. Preferably the PLM comprises cellulose triacetate, a nitrophenyl alkyl ether as the plasticizer and trioctylmethylammonium chloride as the carrier compound.

In a further aspect the invention provides a process for separating monosaccharides from disaccharides and from other monosaccharides which comprises contacting an aqueous source phase of monosaccharide(s) and disaccharide(s) with a PLM containing a boronic acid carrier compound or a boronic acid carrier and a quaternary ammonium salt carrier mixture. The boronic acid carrier compounds are the preferred carriers for the transport of fructose. For example, a saccharide mixture containing equal amounts of sucrose, glucose and fructose is separated in the process of the invention to provide a receiving phase that contains mainly fructose and a small amount of glucose while substantially all of the sucrose remains in the source phase. From the results obtained with the process carried out thus far the general order of sugar fluxes through this particular membrane appears to be fructose>galactose>mannose>glucose>maltose>sucrose. Other commercially important polyols are expected to be transported through this membrane including reduced polyols such as sorbitol and mannitol.

Among the polymer supports, plasticizers and carriers described hereinabove certain are preferred in the practice of this invention. An especially preferred polymer support is cellulose triacetate in the plasticized form. Preferred plasticizers are the phenyl alkyl ethers represented by the formula 1. An especially preferred phenyl alkyl ether is 2-nitrophenyl octyl ether. Another preferred plasticizer is a phosphate triester compound represented by the formula 2. Especially preferred phosphate triesters are tris(pentyloxymethyl)phosphate, tris(butoxyethyl)phosphate and tris(propoxypropyl)phosphate. Among the quaternary ammonium carrier compounds preferred carriers are trimethyloctylammonium chloride, trioctylmethylammonium chloride, tetrahexylammonium chloride, trimethyloxtylammonium bromide, and trimethyloctylammonium diphenylphosphinate. An especially preferred boronic acid carrier compound is represented by the following formula.

$$O_2N-(C_6H_4O)-(CH_2)_n-OC(O)-C_6H_4-B(OH)_2$$

wherein n is an integer of from 4 to 9. Particularly preferred are 4-[8-(2-nitrophenoxy)octyloxycarbonyl]phenylboronic acid, 3-[8-(2-nitrophenoxy)octyloxycarbonyl] phenylboronic acid, 4-(2-nitrophenoxy)hexyloxycarbonyl] phenylboronic acid, 4-[5-(3-nitrophenoxy) pentyloxycarbonyl]phenylboronic acid, and 3-[9-(2-nitrophenoxy)nonyloxycarbonyl]phenylboronic acid. Especially preferred is the carrier, 4-[8-(2-nitrophenoxy) octyloxycarbonyl]phenylboronic acid.

The PLMs containing boronic acid carriers are especially useful in the separation of fructose from glucose and an embodiment of the invention comprises the preparation of high fructose syrup, "HFS". High fructose syrup, is much used as a substitute for sucrose with annual production of around 8 billion kg., (S. Vuilieumier, Am. J. Clin. Nutr., 1993, 58, 733S). Fructose is the sweetest of all naturally occurring carbohydrates having a relative sweetness rating of 128 while sucrose is rated at 100 and glucose at 67, (L. M. Hanover and J. S. White, Am. J. Clin. Nutr., 1993, 58, 724S). The current production of HFS includes the enzymatic or acid hydrolysis of corn starch to produce a feed stream containing about 94% glucose. The glucose is then isomerized enzymatically to a mixture of glucose and fructose which contains a maximum of 42% fructose. The fructose content is then increased to about 55% by chromatographic enrichment. This concentration of fructose provides a sweetness level about that of sucrose which is necessary for use in many applications e.g., in beverages.

In this embodiment of the process, a PLM composed of 20% cellulose triacetate, 40% 2-nitrophenyloctyl ether, 20% 4-[8-(2-nitrophenoxy)octyloxycarbonyl]phenylboronic acid and 20% trimethyloctylammonium chloride separates a source phase at pH 7.3 containing equal amounts of glucose and fructose and a receiving phase of water buffered at pH 7.3. This embodiment of the process provides a receiving phase containing more than 90% fructose of the total fraction of sugar. The flux for this process increased when the source phase was made basic (about pH 10) and the receiving phase maintained at neutral or slightly acidic pH.

In a further embodiment of the process high levels of fructose are obtained in a two-step process shown schematically in FIG. 1 of the drawings. The process is carried out with a PLM comprising cellulose triacetate plasticized with the liquid membrane 2-nitrophenyloctyl ether containing dissolved therein the carrier mixture of 4-[8-(2-nitrophenoxy)octyloxycarbonyl]phenylboronic acid trioctylmethylammonium chloride. The source phase contains an aqueous solution of D-glucose buffered at pH 7.3 and a receiving phase of water buffered at pH 7.3. The entire apparatus is maintained at a temperature of 60° C. In the first step of the process the source phase is treated with D-glucose isomerase, stirring of both phases is started and, in the second step D-fructose generated in the isomerization in the source phase is transported through the membrane into the receiving phase. The fraction of fructose in the receiving phase is generally greater than 80% after the process has proceeded for about 5 hours.

An embodiment of the process which shows the adaptability of the process to various carbohydrate mixtures comprises the separation of monosaccharides from disaccharides. In this embodiment a cellulose triacetate PLM plasticized with the liquid membrane 2-nitrophenyloctyl ether containing dissolved therein the carrier trimethyloctylammonium chloride is used to preferentially transport glucose and fructose from a source phase containing a mixture of equal concentrations of sucrose, glucose and fructose maintained about pH 7.3. The concentration of glucose and fructose in the receiving phase after about 20 hours is generally about 2 to about 3 times greater than the concentration of sucrose.

An embodiment of the process for the extraction of fructose, glucose, and sucrose from molasses comprises a cellulose triacetate PLM plasticized with the liquid 2-nitrophenyloctyl ether containing dissolved therein the carrier trimethyloctylammonium chloride. The PLM is used to selectively transport the sucrose, fructose and glucose that is in a source solution of molasses maintained at about pH 7.3 into an aqueous receiving phase at about the same pH. The concentration of sucrose in the receiving phase after about 6 hours is generally about 3 times greater than the concentration of glucose and fructose. The results obtained in this embodiment after 6 hours of process time differ from those obtained in the preceding embodiment which were obtained after 20 hours of process time.

It will be recognized by those skilled in the art that liquid membranes described in the foregoing embodiments of the invention can be varied and adapted to use in the process with other carbohydrate mixtures e.g., by substituting liquid membranes and carrier compounds for those employed in the described embodiments.

The following Preparations and Examples are provided to further illustrate the invention and the manner of carrying out the process and are not intended to be limitations of the present invention.

EXAMPLES AND EXPERIMENTAL

Preparation 1

Preparation of 4-[8-(2-nitrophenoxy)octyloxycarbonyl] phenylboronic acid

4-Carboxyphenylboronic acid (0.5 g, 3.0 mmol) was dissolved in DMF (25 mL) and potassium bicarbonate (0.60 g, 6.0 mmol) and 8-(boromooctyl)-2-nitrophenyl ether (1.1 g, 3.3 mmol) were added with stirring. The reaction mixture was stirred under a nitrogen atmosphere at 65° C. for 70 h. The reaction mixture was then cooled to room temperature and dilute HCl (0.5M) was added until a pH 2–3 was reached. The acidic aqueous phase was extracted with methylene chloride (3×50 mL). The organic layer was dried over magnesium sulfate, filtered and the solvent removed under reduced pressure to give a yellow liquid. The product was purified by column chromatography (2:1, ethyl acetate/ hexanes) to give a yellow oil in 59% yield. $^1$H NMR (300 MHz, acetone-$d_6$/$D_2O$) d1.44 (8H, m), 1,78 (4H, m), 4.14 (2H, t, J=6.6 Hz), 4.29 (2H, t, J=6.6 Hz), 7.07 (1H, t, J=8.0 Hz), 7.28 (1H, d, J=8.0 Hz) 7.59 (1H, t, J=8.0 Hz), 7.78 (1H, d, J=8.0 Hz), 7.94 (4H,s); $^{13}$C NMR (75 MHz, acetone-$d_6$/ $D_2O$) d25.12, 28.74, 29.00, 29.26, 32.10, 64.19, 68.74, 114.23, 119.63, 124.23, 127.58, 131.24, 133.61, 138.94, 151.29, 165.71; MS (FAB in glycerol matrix) m/z 472 (M+glycerol+H)$^+$ calcd. for $C_{24}H_{30}NO_8B$ 472.2147, found 472.2137.

Preparation 2

Preparation of 4-(N,N-dioctylaminocarbonyl)phenolboronic acid 4-carboxyphenylboronic acid (0.5 mmol) and dioctyl amine (0.55 mmol) are dissolved in water (10 mL) at room temperature. The pH of the suspension is adjusted to pH 5 by the addition of aqueous sodium hydroxide (2%) and 10 mL of a solution of EDCA [1-(3-dimethylaminopropyl)-3-ethyl carbodiimide hydrochloride], 015 mmol is added over a 2 hour period while the pH is maintained at pH 5 during the addition and for 1 hour afterwards. The mixture is stirred at room temperature for 12 hours and cooled to 0° C. for 2 hours. The precipitate of the product is filtered and recrystallized to provide the title compound.

Preparation 3

Preparation of 4-(N,N-dibenzylaminocarbonyl) phenylboronic acid

The title compound is prepared by the procedure described in Preparation 2 by substituting dibenzylamine for dioctyl amine.

Preparations 4–7

The following are preparations of several salt forms of a preferred quaternary ammonium salt carrier compound, trioctylmethylammonium salt.

General Preparation of Trioctylmethylammonium Salts

Trioctylmethylammonium chloride (Aliquat 336, 1.0 g, 2.5 mmol) was dissolved in chloroform (5 mL) and the solution placed in a separatory funnel. The sodium salt of the desired anion was dissolved in water (5 mL) and the solution placed in the separatory funnel. In the case when the sodium salt was not available, the reagent was treated with sodium hydroxide (1 eq) and dissolved in water (5 mL). The two layers were thoroughly mixed and upon separation, the organic layer was washed with water (2×10 mL). The organic layer was then dried over magnesium sulfate, filtered, and the solvent removed under reduced pressure.

Trioctylmethylammonium bis(2-ethylhexyl)phosphate, was obtained as a viscous pale yellow liquid in 89% yield: $^1$H NMR (300 MHz, CDCl$_3$) d0.83 (21H, br, t), 1.30 (42H, br s), 1.44 (4H, br m), 1.60 (6H, br), 3.19 (2H, s), 3.27 (3H, s), 3.68 (4H, br); $^{13}$C NMR (75 MHz, CDCl$_3$) d10.43, 13.58, 21.83, 22.09, 22.64, 22.79, 25.86, 28.58, 28.69, 28.94, 29.12, 31.18, 31.34, 32.44, 39.89, 48.09, 60.78, 67.18; MS (negative ion FAB in NBA matrix) m/z 321 (M)$^-$.

Trioctylmethylammonium p-toluenesulfonate, was obtained as a white waxy solid in 78% yield: $^1$NMR (300 MHz, CDCl$_3$) d0.87 (9H, t, J=6.6 Hz), 1.26 (30H, br s), 1.61 (6H, br), 2.30 (3H, s), 3.20 (3H, s), 3.29 (6H, br t), 7.11 (2H, d, J=7.8 Hz), 7.76 (2H, d, J=8.1 Hz); $^{13}$C NMR (75 MHz, CDCl$_3$) d14.00, 21.19, 22.28, 22.54, 26.22, 28.99, 29.07 29.14, 29.22, 29.35, 31.60, 48.64, 61.30, 62.87, 125.94, 128.40, 138.75, 144.14; MS (negative ion FAB in NBA matrix) m/z 171 (M)$^-$.

Trioctylmethylammonium p-methylbenzoate, was obtained as a viscous yellow liquid in 82% yield: $^1$H NMR (300 MHz, CDCl$_3$) d0.79 (9H, t, J=6.6 Hz), 0.81 (30H, br s), 1.46 (6H, br s), 3.12 (3H, s), 3.17 (6H, br t), 7.00 (2H, d, J=8.1 Hz), 7.87 (2H, d, J=8.1 Hz); $^{13}$C NMR (75 MHz, CDCl$_3$) d13.86, 21.11, 22.12, 22.41, 25.80, 26.08, 28.82, 28.92, 28.96, 29.06, 29.17, 29.22, 29.36, 29.46, 31.44, 31.64, 32.81, 48.47, 61.05, 62.17, 127.79, 128.33, 136.64, 138.57; MS 9negative ion FAB in NBA matrix) m/z 135 (M)$^-$.

Trioctylmethylammonium diphenylphosphinate, was obtained as a viscous pale yellow liquid in 75% yield: $^1$H NMR (300 MHz, CDCl$_3$) d0.86 (9H, t, J=6.9 Hz), 1.22 (30H, br s), 1.52 (6H, br), 3.26 (3H, s), 3.30 (6H, br t), 7.22 (6H, m), 7.86 (4H, m); $^{13}$C NMR (75 MHz, CDCl$_3$) d13.98, 22.27, 22.55, 26.18, 28.94, 29.07, 29.18, 29.28, 29.34, 31.57, 31.77, 48.84, 61.05, 127.21, 128.43, 131.55; MS (negative ion FAB in NBA matrix) m/z 217 (M)$^-$.

Preparation 8

Preparation of Cellulose Triacetate PLM

A mixture of 0.1 g of cellulose triacetate 0.20 g of plasticizer and 0.2 g of a carrier compound were dissolved in 5 mL of chloroform. The solution was poured into a 9 cm diameter flat-bottomed glass petri dish. The petridish was loosely covered and left overnight at room temperature to allow for complete solvent evaporation. The membrane which had formed was peeled away from the dish to give a thin transparent film which was then used in the process.

EXAMPLES 1–6

PLM Transport of Saccharides

Transport experiments unless indicated otherwise were carried out in a permeation cell consisting of two identical cylindrical compartments (each compartment volume: 60 mL) that were separated by a thin sheet of plastic membrane. Aqueous sodium phosphate buffer solution (60 mL, 100 mM, pH 7.3) and saccharide (300 mM) was used as the source phase and sodium phosphate buffer (60 mL, pH 7.3) as the receiving phase. The measurements were usually performed at a constant temperature of 25° C. The amount of transported saccharide was determined by standard assays, e.g, colorimetric or enzymatic assays. Standard assay methods are described by Beutler, H. O., in *Methods of Enzymatic Analysis*, H. U. Bergmeyer, Ed. Verlag Weinhelm, 3rd. Ed., 1983, Vol. 6, pp. 321–327.

Table 1 below lists the effect of carriers on the transport of glucose fructose and sucrose through a preferred PLM. In the absence of a carrier the flux of the sugars is minimal.

TABLE 1

Effect of Plasticizers and Carrier on the Transport of Saccharides through Cellulose Triacetate Membranes[a]

| Examp No. | Plasticizer[b] | Carrier[c] | Flux (10$^{-8}$ mol/m$^2$s) | | |
|---|---|---|---|---|---|
| | | | Glucose | Fructose | Sucrose |
| 1 | NPOE | none | 1.2 | 1.9 (0.2)[d] | 0.3 |
| 2 | NPOE | TOMA$^+$ Cl$^-$ | 572 | 1000 | 297 |
| 3 | NPOE/TBEP | none | — | 0.7 | — |
| 4 | NPOE/TBEP | TOMA$^+$ Cl$^-$ | — | 1290 | — |
| 5 | TBEP | none | — | 14.5 (23.5)[e] | — |
| 6 | TBEP | TOMA$^+$ Cl$^-$ | — | 3180 (3920)[f] | — |

[a]Source Phase: 0.1M NaH$_2$PO$_4$ buffer pH 7.3, saccharide (0.3M); Membrane: Cellulose triacetate (0.1 g), plasticizer (0.2 g), carrier (0.2 g); Receiving Phase: 0.1M NaH$_2$PO$_4$ buffer pH 7.3; Temperature: 298K.
[b]NPOE is 2-Nitrophenyl octyl ether, TBEP is Tris(2-butoxyethyl)phosphate.
[c]TOMA$^+$ Cl$^-$ is Trioctylmethylammonium chloride.
[d]Long term experiment run over 94 h.
[e]Long term experiment run over 68 h.
[f]Long term experiment run over 147 h.

Table 1 (Example 6) shows the high rate of transport of fructose with a preferred quaternary ammonium salt carrier.

Figure 2:
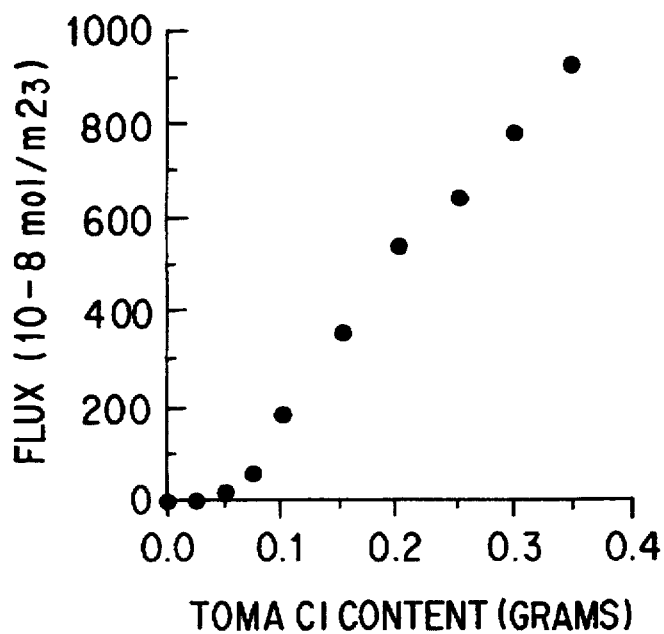
FIG. 2 of the drawing depicts the effect of the amount of carrier on the transport of fructose in the process.

In FIG. 2 of the drawing the effect of the amount of carrier on the transport of fructose is shown.

The following Table 2 lists experiments in which the anion of the quaternary ammonium salt and the phosphonium salt is varied with two plasticizers. As shown in entries 8 and 9 the trioctylmethylammonium halides give the best results although other anionic forms gave satisfactory flux with a preferred plasticizer TBEP.

TABLE 2

Effect of Varying Carrier Anion and Cation on the Transport of Fructose through Cellulose Triacetate Membranes[a]

| Entry | Carrier[c] | Departure phase pH | Flux (10$^{-8}$ mol/m$^2$s) | |
|---|---|---|---|---|
| | | | NPOE[b] | TBEP[b] |
| 7 | none | 7.3 | 1.9 | 14.5 |
| 8 | TOMA$^+$ Cl$^-$ | 10 | 213 | — |
| 9 | TOMA$^+$ Cl$^-$ | 7.3 | 1000 | 3180 |
| 10 | TOMA$^+$ Br$^-$ | 7.3 | 457 | 2341 |
| 11 | TOMA$^+$ Tetraphenyl borate$^-$ | 7.3 | — | 5.4 |
| 12 | TOMA$^+$ p-Toluenesulfonate$^-$ | 7.3 | 8.6 | 163 |
| 13 | TOMA$^+$ Bis(2-ethylhexyl) phosphonate$^-$ | 7.3 | 26.2 | 123 |
| 14 | TOMA$^+$ p-Toluene carboxylate$^-$ | 7.3 | 40.9 | 590 |
| 15 | TOMA$^+$ Diphenylphosphinate$^-$ | 7.3 | 105 | 597 |
| 16 | Tetraoctylphosphonium Br$^-$ | 7.3 | 42.3 | 327 |

[a]Source Phase: 0.1M NaH$_2$PO$_4$ buffer, D-Fructose (0.3M); Membrane: Cellulose triacetate (0.1 g), plasticizer (0.2 g), carrier (0.2 g); Receiving Phase: 0.1M NaH$_2$PO$_4$ buffer pH 7.3; Temperature: 298K.
[b]NPOE is 2-Nitrophenyl octyl ether, TBEP is Tris(2-butoxyethyl)phosphate.
[c]TOMA$^+$ is trioctylmethylammonium cation.

The following Table 3 list experiments on the transport of D-glucose with variation in the buffer used. When both the source phase and the receiving phase were buffered the better flux was obtained with the carrier and plasticizer used in the experiments.

TABLE 3

Effect of buffer on the Transport of D-Glucose through Cellulose Triacetate Membranes[a]

| Entry | Carrier | Source Phase | Receiving Phase | Flux ($10^{-8}$ mol/ $m^2$s) NPOE[d] |
|---|---|---|---|---|
| 17 | TOMA Cl[-] | NaH$_2$PO$_4$ buffer[b] | NaH$_2$PO$_4$ buffer | 572 |
| 18 | TOMA Cl[-] | NaH$_2$PO$_4$ buffer | H$_2$O[c] | 318 |
| 19 | TOMA Cl[-] | H$_2$O | NaH$_2$PO$_4$ buffer | 279 |
| 20 | TOMA Cl[-] | H$_2$O | H$_2$O | 92.4 |

[a]Source Phase: aqueous (60 mL); D-Glucose (0.3M); Membrane Cellulose triacetate (0.1 g), plasticizer (0.2 g), carrier (0.2 g); Receiving Phase: aqueous (60 mL); Temperature: 298K.
[b]Buffer: 0.1M NaH$_2$PO$_4$ buffer pH 7.3
[c]Water adjusted to pH 7.3 with dilute NaOH
[d]NPOE is 2-Nitrophenyl octyl ether, TBEP is Tris(2-butoxyethyl)phosphate.

EXAMPLES 7–12

The following Table 4 shows the results obtained in the process with sucrose, D-glucose and D-fructose by varying the carrier. In Example 10 of the table the results of the embodiment described hereinabove wherein a solution of D-glucose in the source phase is treated with D-glucose isomerase and the fructose produced in the source phase is transported through the PLM to obtain the percentage of each sugar in the receiving phase that is indicated.

TABLE 4

Competitive Transport of D-Glucose, D-Fructose and Sucrose Through PLMs Containing Different Carriers[a]

| EXAMP NO. | Plas- ticizer[b] | Carrier[c] | Flux ($10^{-8}$ mol/m$^2$) | |
|---|---|---|---|---|
| | | | Glucose | Fructose |
| 7[d] | NPOE | NPOE Boronic acid + TOMA[+] Cl[-] | 3.6 | 34.0 |
| 8 | NPOE | TOMA[+] Cl[-e] | 103 | 90.7 |
| 9 | NPOE | NPOE Boronic acid[f] | — | — |
| 10 | NPOE | NPOE Boronic acid + TOMA[+] Cl[-] + Glucose isomerase | 23% | 77% |

| | | | Glucose | Fructose | Sucrose |
|---|---|---|---|---|---|
| 11 | NPOE | NPOE Boronic acid + TOMA[+] Cl[-] | 2.9 | 23.8 | 0.27 |
| 12 | NPOE | TOMA[+] Cl[-] | 138 | 109 | 30.7 |

[a]Source Phase: 0.1M NaH$_2$PO$_4$ buffer pH 7.3, saccharide (0.3M); Membrane: Cellulose triacetate (0.1 g), plasticizer (0.2 g), carrier (0.2 g); Receiving Phase: 0.1M NaH$_2$PO$_4$ buffer pH 7.3; Temperature: 298K. Membranes were washed with deionized water for 24 h after each run.
[b]NPOE is 2-Nitrophenyl octyl ether, TBEP is Tris(2-butoxyethyl)phosphate.
[c]Unless stated otherwise, each carrier component was (0.1 g).
[d]Membrane was used in a previous experiment and was washed with water for 5 h.
[e]TOMA Cl[-] concentration is only (0.1 g).
[f]NPOE Boronic acid was shown to have leached out of the membrane. NPOE Boronic acid is 4-[8-(2-nitrophenoxy)octyloxycarbonyl]phenylboronic acid As shown in Table 4, example 12, the three sugars of the mixture in the source phase were all transported with the quaternary ammonium salt carrier. In example 7 the preferential transport of fructose over glucose with the boronic acid carrier is clearly demonstrated. Likewise in example 11 the better transport of fructose with the boronic acid carrier is demonstrated.

We claim:

1. A process for separating monosaccharides and disaccharides from crude mixtures thereof which comprises contacting an aqueous solution of the saccharide mixture at a pH between about 2 and about 12 with one surface of a plasticized liquid membrane said membrane being in contact at an opposite surface with an aqueous receiving phase at a pH between about 2 and about 12 wherein said membrane comprises 1) an inert lipophilic polymer selected from polyvinyl acetate, polyvinyl chloride, polyvinyl butyral, polymethacrylate, cellulose triacetate and cellulose nitrate, 2) a hydrophobic organic liquid plasticizer and, 3) a carrier compound selected from a quaternary ammonium salt of the formula

wherein each of the R radicals is a $C_1$–$C_{20}$ straight or branched chain alkyl group or a cyclo aliphatic group containing from 3 to 8 carbon atoms, and wherein at least one of the R radicals is a straight or branched chain alkyl group having from 4 to 20 carbon atoms, and A[-] represents a halide for example, chloride, bromide or iodide, or a conjugate base of an acid for example, a carboxylate, sulfonate, phosphonate, or phosphinate anion; and a tetraalkylphosphonium salt or the formula

wherein each R radical and A have the same meanings as defined above for the quaternary ammonium salt carrier.

2. The process of claim 1 wherein the hydrophobic organic liquid plasticizer is selected from an ether of the formula

wherein, $R^0$ and $R^1$ independently are a straight or branched $C_4$–$C_{10}$ alkyl hydrocarbon radical; phenyl or phenyl substituted by halogen, $C_1$–$C_4$ alkyl, nitro, cyano, trifluoromethyl, $C_1$–$C_4$ alkoxy or $C_1$–$C_4$ alkoxycarbonyl;
a phosphate tri-ester of the formula

wherein, $R^2$ is $C_1$–$C_{16}$ alkyl and m is an integer of from 1 to 3; a glycerol phosphate ester ofthe formula

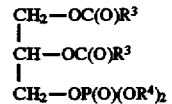

wherein, each $R^3$ is the same or different straight or branched chain alkyl residue of a $C_4$–$C_{16}$ alkyl carboxylic acid and $R^4$ is $C_1$–$C_{16}$ alkyl;
and a triglyceride of the formula

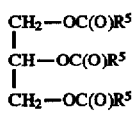

wherein each $R^5$ is the same or different straight or branched chain $C_4$–$C_{16}$ alkyl residue.

3. The process of claim 1 wherein the crude mixture is molasses and wherein sucrose, glucose and fructose are separated therefrom.

4. The process of claim 1 wherein the inert polymer is cellulose triacetate.

5. The process of claim 4 wherein the organic liquid plasticizer is an ether of the formula $R^0$—O—$R^1$ and the carrier compound is a quaternary ammonium salt.

6. The process of claim 4 wherein the organic liquid plasticizer is 2-nitrophenyloctyl ether and the carrier compound is trioctylmethylammonium chloride.

7. A process for separating monosaccharides from an aqueous mixture of monosaccharides and one or more disaccharides which comprises contacting said aqueous mixture at a pH between about 2 and about 12 with one surface of a plasticized liquid membrane said membrane being in contact at an opposite surface thereof with an aqueous receiving phase at a pH between about 2 and about 12 wherein said liquid membrane comprises 1) cellulose triacetate as the lipophilic polymer, 2) an organic liquid plasticizer of the formula

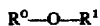
$R^0$—O—$R^1$ wherein, $R^0$ and $R^1$ independently are a straight or branched $C_4$–$C_{10}$ alkyl hydrocarbon radical; phenyl or phenyl substituted by halogen, $C_1$–$C_4$ alkyl, nitro, cyano, trifluoromethyl, $C_1$–$C_4$ alkoxy or $C_1$–$C_4$ alkoxycarbonyl; and 3) a carrier compound selected from a quaternary ammonium salt of the formula

$R^6R^7R^8R^9N^+A^-$ wherein each of the R radicals is a $C_1$–$C_{20}$ straight or branched chain alkyl group or a cyclo aliphatic group containing from 3 to 8 carbon atoms, and wherein at least one of the R radicals is a straight or branched chain alkyl group having from 4 to 20 carbon atoms, and $A^-$ represents a halide for example, chloride, bromide or iodide, or a conjugate base of an acid for example, a carboxylate, sulfonate, phosphonate, or phosphinate anion, and a tetraalkylphosphonium salt of the formula

$R^6R^7R^8R^9P^+A^-$ wherein each R radical and A have the same meanings as defined above for the quaternary ammonium salt; and wherein the process is allowed to continue for about 20 hours.

8. The process of claim 7 wherein the monosaccharides glucose and fructose are separated from sucrose in the mixture.

9. The process of claim 8 wherein the carrier compound is trioctylmethylammonium chloride and the organic liquid plasticizer is 2-nitrophenyloctyl ether.

10. The process of claim 8 wherein the plasticized liquid membrane contains in addition to the quaternary ammonium salt carrier or the tetraalkylphosphonium salt carrier a boronic acid carrier compound of the formula

$R^{10}$—B(OH)$_2$ wherein $R^{10}$ is a substituted phenyl group of the formula —($C_6H_4$)—C(O)—Z wherein Z represents an alkoxy group —O—$R^{11}$ or an amino group —NR$^{12}$R$^{13}$, wherein R$^{11}$ is a straight or branched chain $C_4$–$C_{10}$ alkyl radical which can be substituted by phenyl or phenoxy, or phenoxy and phenyl substituted by lower alkyl, halogen, lower alkoxy, nitro, carboxy, lower alkoxycarbonyl, carboxamido or cyano, R$^{12}$ and R$^{13}$ independently are $C_1$–$C_{12}$ alkyl which can be substituted by phenyl or phenoxy or phenyl and phenoxy substituted by lower alkyl, lower alkoxy, halogen, nitro, carboxy, carboxamido, cyano, or lower alkoxycarbonyl.

11. The process of claim 7 wherein the pH of the aqueous mixture and aqueous receiving phase is maintained at about 7.3.

12. The process for separating fructose from an aqueous mixture of glucose and fructose which comprises contacting said aqueous mixture at a pH between about 7.5 and about 8.5 with one surface of a plasticized liquid membrane said membrane being in contact at an opposite surface thereof with an aqueous receiving phase at a pH between about 6 and about 7 and wherein said membrane contains a boronic acid carrier compound of the formula $R^{10}$B(OH)$_2$ wherein $R^{10}$ is a lipophilic alkyl or lipophilic aromatic group.

13. The process of claim 12 wherein the plasticized liquid membrane comprises the polymer cellulose triacetate, 2-nitrophenyloctyl ether or 2-nitrophenylheptyl ether as the plasticizer and, the boronic acid carrier of the formula

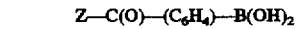
Z—C(O)—($C_6H_4$)—B(OH)$_2$ wherein Z represents an alkoxy group —O—$R^{11}$ or an amino group —NR$^{12}$R$^{13}$, wherein R$^{11}$ is a straight or branched chain $C_4$–$C_{10}$ alkyl radical which can be substituted by phenyl or phenoxy, or phenoxy and phenyl substituted by lower alkyl, halogen, lower alkoxy, nitro, carboxy, lower alkoxycarbonyl, carboxamido or cyano, R$^{12}$ and R$^{13}$ independently are $C_1$–$C_{12}$ alkyl which can be substituted by phenyl or phenoxy or phenyl and phenoxy substituted by lower alkyl, lower alkoxy, halogen, nitro, carboxy, carboxamido, cyano, or lower alkoxycarbonyl.

14. The process of claim 13 wherein the boronic acid carrier is selected from 4-[8-(2-nitrophenoxy)octyloxycarbonyl]phenylboronic acid and 4-[6-(2-nitrophenoxy)hexyloxycarbonyl]phenylboronic acid.

15. The process of claim 12 wherein the liquid membrane comprises cellulose triacetate polymer, the plasticizer tris-(2-butoxyethyl)phosphate and the carrier trioctylmethylammonium chloride.

16. The process of claim 12 wherein the liquid membrane comprises the polymer cellulose triacetate, the plasticizer 2-nitrophenyloctyl ether, and the carrier 4-[8-(2-nitrophenoxy)octyloxycarbonyl]phenylboronic acid.

17. The process of claim 12 wherein the liquid membrane comprises the polymer cellulose triacetate, the plasticizer 2-nitrophenyloctyl ether, and the carrier mixture of 4-[8-(2-nitrophenoxy)octyloxycarbonyl]phenylboronic acid and trioctylmethylammonium chloride.

18. The process for separating fructose from an aqueous mixture of glucose and fructose which comprises the steps 1) contacting an aqueous solution of glucose at a pH between about 7.5 and about 8.5 with one surface of a plasticized liquid membrane said membrane being in contact at an opposite surface thereof with an aqueous receiving phase at a pH between about 6 and about 7 and, 2) adding glucose isomerase to said glucose solution.

19. The process of claim 18 wherein the liquid membrane comprises the polymer cellulose triacetate, the organic liquid plasticizer 2-nitrophenyloctyl ether and, the carrier 4-[8-(2-nitrophenoxy)octyloxycarbonyl]phenylboronic acid.

20. The process of claim 19 wherein the carrier is a mixture of 4-[8-(2-nitrophenoxy)octyloxycarbonyl] pheylboronic acid.

* * * * *